2,838,329

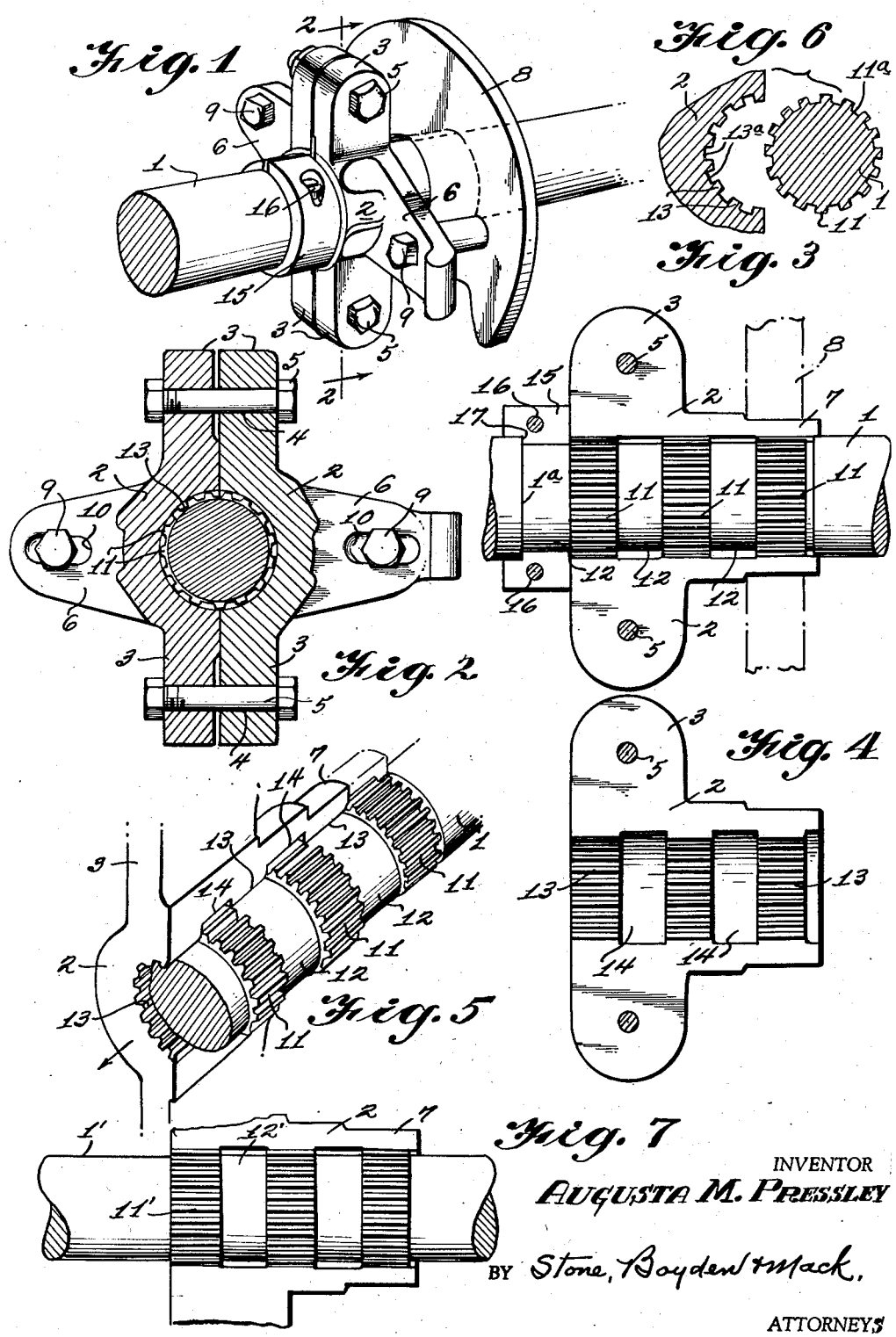

SHAFT AND HUB CONSTRUCTIONS

Augusta M. Pressley, Concord, N. C.

Application February 19, 1957, Serial No. 641,059

2 Claims. (Cl. 287—52.03)

This invention relates to means for fixedly securing a hub to a round shaft, and more particularly for securing a hub to such a shaft in any desired angular position relative thereto.

The invention is of wide applicability. While the hub may be employed for mounting any one of a number of different mechanical elements, the invention has special utility when employed for adjustably mounting a cam on a cam shaft, as, for example, the cam shaft of a loom.

In order that the invention may be readily understood, reference is had to the accompanying drawing forming part of this specification, and illustrating, by way of example, one embodiment of the invention. In this drawing:

Fig. 1 is a perspective view of a complete hub used for mounting a cam on a cam shaft;

Fig. 2 is a transverse section substantially on the line 2—2 of Fig. 1;

Fig. 3 is an elevational view of one half of the hub mounted on the shaft, a fragment of the cam being shown in broken lines;

Fig. 4 is an elevational view of the inside of one half of the hub, detached from the shaft;

Fig. 5 is a perspective view showing one half of the hub on the shaft, but illustrating how the hub section may be disconnected from the shaft by axial movement there along;

Fig. 6 is a fragmentary transverse section, similar to Fig. 2, but showing the parts separated; and Fig. 7 is a fragmentary elevational view showing a slightly modified construction of the shaft.

Referring to the drawing in detail, 1 designates a round shaft such as is commonly used in machinery. Mounted on this shaft, to rotate therewith, is a split hub shown as made up of two halves or sections 2. This hub has mating pairs of arms 3 projecting radially from each half and provided with alined openings 4 through which pass bolts 5 for holding the two halves of the hub together. Projecting at substantial right angles to the arms 3 are another pair of arms 6, one carried by each half of the hub. The hub is formed at one end with a cylindrical extension 7 of reduced diameter and on this extension may be mounted a cam 8, secured to the arms 6 by means of bolts 9 passing through holes 10 in these arms. Thus the cam is rigidly connected with the hub.

Referring more particularly to Figs. 3 and 5, it will be seen that I form on the shaft 1 a plurality of annular series of splines or teeth 11, these series of teeth being separated by spaces or smooth zones 12.

Similarly, the concave portion of each hub half 2 is formed with a plurality of semi-annular series of splines or teeth 13 separated by spaces or smooth zones 14. It will be understood that, as clearly shown in Figs. 3 and 5, the width of the smooth zones or spaces 12 on the shaft must be slightly greater than the length of the splines 13 on the hub sections, and, vice versa, the spaces or smooth zones 14 in the hub sections must be at least as wide as the length of the splines 11 on the shaft. This is necessary in order that the annular series of splines on one part may be received in the smooth zone or space of the other part, as shown in Fig. 5.

As shown most clearly in Fig. 6, the splines 11 on the shaft are separated by grooves 11ª, and the splines 13 on the hub are separated by grooves 13ª, the splines on one part fitting the grooves in the other part. The sides of the splines are cut substantially on a radius and are flat, and the splines also preferably have flat tops, as shown in Figs. 5 and 6. This provides a more effective interlock. If it is desired to have the hub angularly adjustable on the shaft through 360°, as is often the case in cam mechanism, the circumferential spacing of the splines in each series must be uniform.

On the side of the hub opposite the cam 8 I provide a split locking ring or collar consisting of two similar sections 15 held together by bolts or screws 16. This locking ring is formed near its outer side with an annular shoulder 17 which is adapted to engage a similar annular shoulder 1ª formed on the shaft 1 and constituting an abutment. Thus, when the split collar is placed in position and the sections secured together by means of the bolts 16, it bears against the end of the hub, and the engagement of the shoulders 17 and 1ª effectively and rigidly holds the hub against axial displacement, it being understood that there is a similar shoulder adjacent the cam on the other side, forming a stop means against which the extension 7 engages to limit movement of the hub in that direction.

Fig. 1 shows the hub, cam and shaft assembled as they appear when ready for use. When it is desired to angularly adjust the hub and cam on the shaft, the screws 16 are taken out and the locking ring removed. Then the bolts 5 and 9 are also removed, and the cam slipped off of the extension 7. The hub may now be shifted axially of the shaft, thus disengaging the splines 13 of the hub from the grooves 11ª of the shaft and causing the splines 13 of the hub to enter and occupy the smooth zones 12 of the shaft.

Even after the bolts 5 have been removed, the hub halves, when in normal operating position, cannot be separated from the shaft because of the fact that the splines on the respective parts have substantially radial sides and interlock. This will be clear from an inspection of Figs. 2 and 5. When, however, the hub is shifted to the position shown in full lines in Fig. 5, the halves may be freely separated and removed laterally from the shaft.

When it is desired to reassemble the parts, either in the same or angularly adjusted position, the hub halves are placed on the shaft at the desired angle and are then slid along the shaft axially to the position indicated by broken lines in Fig. 5, where their movement is arrested by engagement of the extension 7 with the stop means on the shaft. In this position the splines of the hub interlock again with the splines of the shaft. The locking ring 15 is then replaced and the bolts 5 and 9 reinserted.

In this way, it is possible to shift the cam 8 to any desired angular position on the shaft and to lock it securely in such position against both circumferential and axial displacement.

While, in Figs. 1 to 5, I have shown the outer surface of the splines as flush with the surface of the shaft, and the smooth zones 12 of smaller diameter than the shaft, in Fig. 7 I have shown an alternate arrangement in which the smooth zones 12' are flush with the surface of the shaft 1', while the splines 11' project radially beyond this surface. Either method may be employed, as preferred.

While I have shown the shaft and the hub as each formed with a plurality of annular series of interlocking splines separated by a plurality of smooth zones, and while this is the preferred construction, it will be understood that the invention, in its broader aspects, contemplates also the use of only a single annular series of splines on each part, if desired. In this case, a single smooth zone only on one of the parts will suffice, while a smooth zone will be required on each side of the series of splines on the other part, as will be obvious.

What I claim is:

1. The combination with a shaft having thereon an annular series of splines, and a smooth zone adjacent thereto, of a split hub comprising a pair of separable halves, each half having a semi-annular series of splines formed thereon and a smooth zone adjacent thereto, said series of splines on the respective parts being constructed to interlock, bolts holding said separable halves together and spaced laterally from said shaft, said splines having substantially radial sides, whereby, when interlocked, separation of said halves is prevented even when said bolts are removed, said two series of splines being disengageable only by shifting the hub halves axially relative to said shaft to such an extent that the splines on one part register with the smooth zone on the other part, stop means preventing relative axial shifting of said hub halves and shaft in one direction, an abutment on said shaft, and removable means co-operating with said abutment for normally locking said hub halves and shaft rigidly against relative axial shifting in the other direction, thus preventing disengagement of said splines.

2. The combination set forth in claim 1 in which the stop means is disposed on the shaft at one side of the hub to limit its axial movement in that direction and the abutment is at the other side of the hub, but spaced therefrom, and in which the removable means is a split collar interposed between said abutment and hub.

References Cited in the file of this patent

UNITED STATES PATENTS

| | | |
|---|---|---|
| 581,476 | Blanton | Apr. 27, 1897 |
| 1,580,780 | Dixon et al. | Apr. 13, 1926 |
| 1,881,080 | Hubert | Oct. 4, 1932 |
| 2,671,367 | Modin | Mar. 9, 1954 |